June 18, 1957

E. J. HAZEN 2,795,929

FUEL CONTROL SYSTEM AND REGULATOR FOR
AN INTERMITTENT OR RAM JET ENGINE

Filed Feb. 2, 1949

INVENTOR.
EDWARD J. HAZEN
BY
ATTORNEY

INVENTOR.
EDWARD J. HAZEN
BY
ATTORNEY

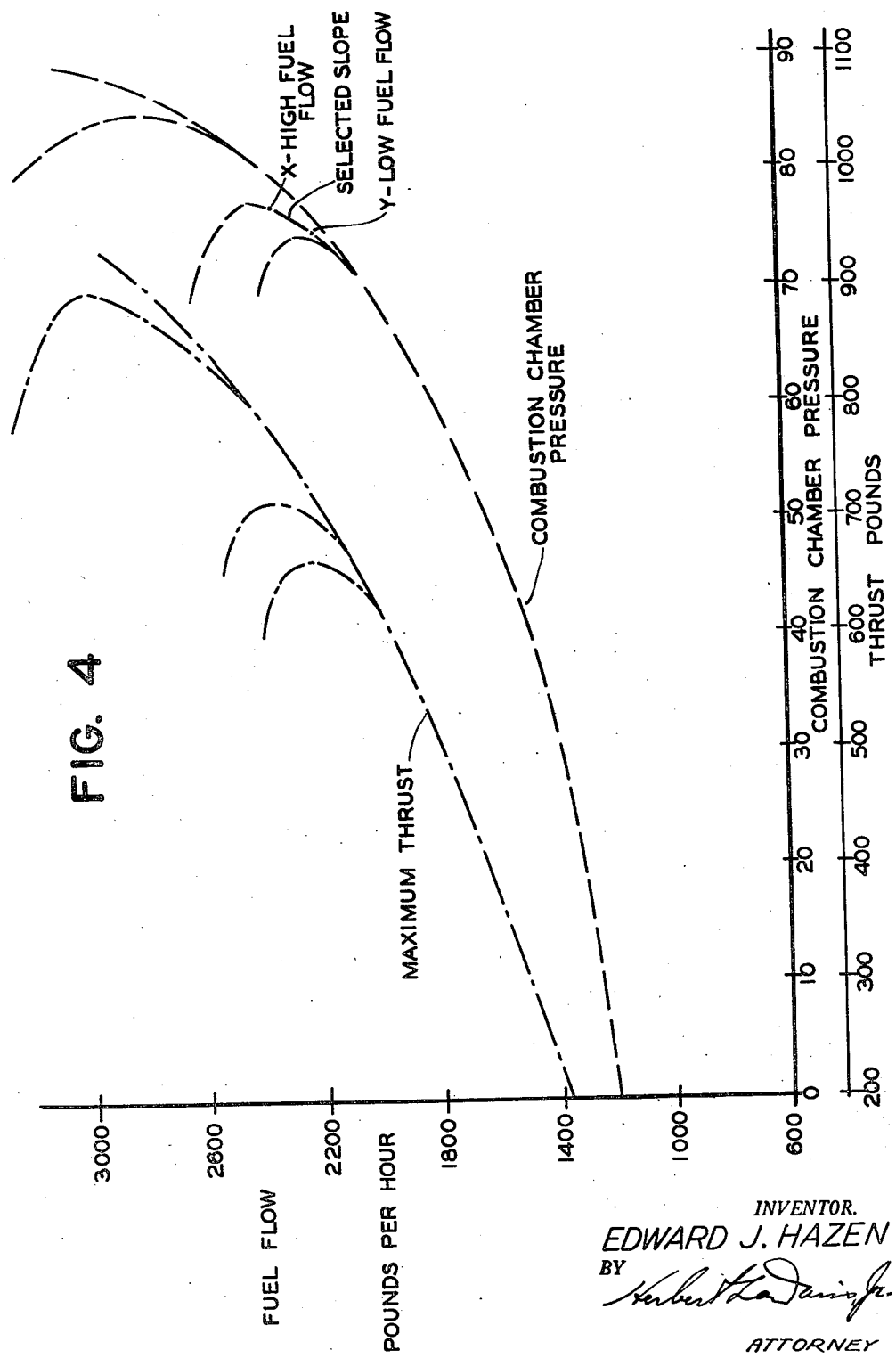

United States Patent Office 2,795,929
Patented June 18, 1957

2,795,929

FUEL CONTROL SYSTEM AND REGULATOR FOR AN INTERMITTENT OR RAM JET ENGINE

Edward J. Hazen, Westwood, N. J., assignor to Bendix Aviation Corporation, Teterboro, N. J., a corporation of Delaware Application February 2, 1949, Serial No. 74,186

26 Claims. (Cl. 60—39.28)

The present application relates to a fuel control system and regulator for an intermittent or ram jet engine to maintain operation of the engine at a particular slope of a fuel flow versus combustion chamber pressure curve regardless of variations in ambient conditions.

As fuel flow to the engine is increased, the combustion chamber pressure, and the thrust developed, increase to a maximum depending on ambient and operating conditions. Further increase in fuel flow results in decreasing combustion chamber pressure.

Heretofore, one solution of the problem involved a control of the type disclosed and claimed in the copending application Serial No. 3,006, now Patent No. 2,697,327, filed January 19, 1948 by Edward J. Hazen and James E. Bevins in which the fuel delivered to the engine is gradually increased until the combustion chamber pressure passes its maximum value and starts to decrease, at which time the control will operate to start reducing the quantity of fuel delivered which will then cause the combustion pressure to increase again until the maximum value is passed, whereupon the control repeats its previous operation so as to keep the engine seeking the maximum combustion pressure.

Operation of the engine at the maximum combustion pressure does not provide most economical operation, but rather it has been found that depending upon the operating characteristics of the engine, a range somewhat below the maximum pressure value provides more desirable operating characteristics.

Operation of the regulator of the present invention is based on supplying small and uniform increments of excess fuel flow to the engine at regulated intervals and sampling the resulting combustion chamber pressure with and without these extra fuel increments. The combustion pressures are valved so that the pressure resulting from the high fuel flow is directed to one side of a pressure sensitive diaphragm and the pressure during low fuel flow to the other side of the diaphragm. The diaphragm force, from the difference in these two pressures, is balanced by a spring which may be adjusted for the predetermined desired operating slope on the pressure fuel flow curve. Any unbalance between the diaphragm force and the spring operates a pilot valve which controls the fuel nozzle pressure through a regulating valve.

It is an object of the present invention to provide a control to operate the engine so that the maximum thrust or range will be obtained for the minimum quantity of fuel used. In order to accomplish the foregoing, it is necessary that the control maintain a constant slope of the fuel flow versus thrust curve.

Another object of the invention is to provide a control in which the average constant slope is maintained by alternately increasing and decreasing the fuel supply to the engine and in which the pressure in the combustion chamber (thrust) is sampled first, as the fuel is increased, and then, as the fuel is decreased so that the difference between these two pressures provides the basis for operation of the control.

Another object of the invention is to provide novel means for placing the control unit into operation in which compressed air supplied to the combustion chamber of the jet engine serves to actuate a shut-off valve which in the starting position acts to throttle the fuel to the fuel nozzle so as to supply the necessary fuel pressure for starting.

Another object of the invention is to provide a control in which simultaneously with supplying fuel and compressed air to the jet engine, a hydraulic clock under pressure of the fuel supply is started in motion so as to run at a constant speed due to the regulatory effect of a constant flow regulator.

Another object of the invention is to provide a control unit including a clock mechanism to position a pair of distributor valves, one of the valves being arranged to alternately direct nozzle pressure and nozzle pressure plus a constant to effect the fuel regulating valve so as to give the engine an alternate supply of more, then less fuel, and the other distributor valve being arranged to direct in synchronization with the fuel pulses, combustion chamber pressure first to one side of a pressure sensitive diaphragm and then to the other side of the diaphragm which diaphragm in turn effects the fuel regulator. The clock operated distributor valves are so synchronized that fuel flow is modified first, then the combustion chamber pressure is sampled. The regulator tends to maintain a constant difference between the two combustion chamber pressures applied at opposite sides of the diaphragm. In the event the correct difference is not effected, the diaphragm acts to adjust the fuel pressure regulator so as to modify the fuel pressure and thereby the combustion chamber pressure to maintain operation at the desired constant slope of the fuel flow versus thrust curve.

Another object of the invention is to provide novel means to alternately apply a variable pressure increment to a pressure regulating valve which increment increases with increase in fuel nozzle pressure so as to cause a greater increase in the fuel nozzle pressure at high fuel pressures than at low fuel pressures to effect alternate uniform fuel flow increments over the entire operating range.

The above and other objects and features of the invention will appear more fully hereinafter from a consideration of the following description taken in connection with the accompanying drawings wherein one embodiment of the invention is illustrated by way of example.

In the drawings:

Figure 4 is a graphical illustration of a typical ram or intermittent jet engine performance chart showing particularly fuel flow versus thrust and combustion chamber pressure curves.

Figure 1:
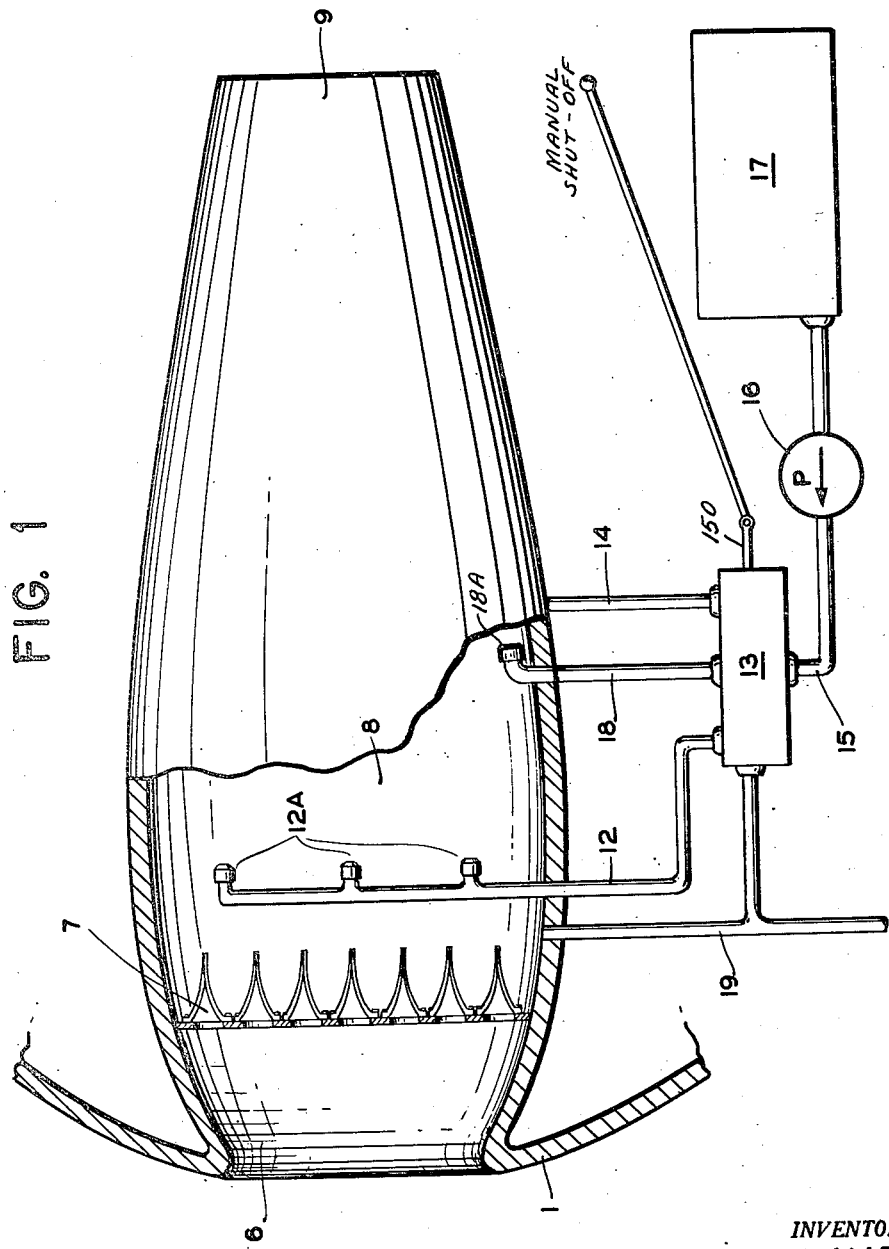
Figure 1 is a schematic view illustrating the regulator connected in operative relation in a typical ram or intermittent jet engine.

Referring to the drawing of Figure 1, there is indicated generally by the numeral 1 an aircraft or guided missile of conventional type and including an air inlet 6 having suitable air inlet check valves 7 of well known design opening into a combustion chamber 8.

The combustion chamber 8 exhausts operating gas through outlet passage 9 to atmosphere to propel the aircraft or missile 1.

Fuel is supplied to the combustion chamber 8 through a conduit 12 leading to main fuel nozzles 12A opening into the chamber 8. The fuel in conduit 12 is controlled by a regulator 13 sensitive to the pressure in the combustion chamber 8 through a conduit 14, as explained hereinafter.

Fuel is supplied to the regulator 13 through a conduit 15 under pressure of a pump 16 from a suitable liquid fuel supply 17. As explained hereinafter, some of the fuel under pressure of the pump 16, is used to operate the regulator 13. The latter fuel is drained into the combustion chamber 8 through conduit 18 and burned with a low pressure nozzle 18A so as not to be wasted.

STARTING OPERATION

Figure 2:
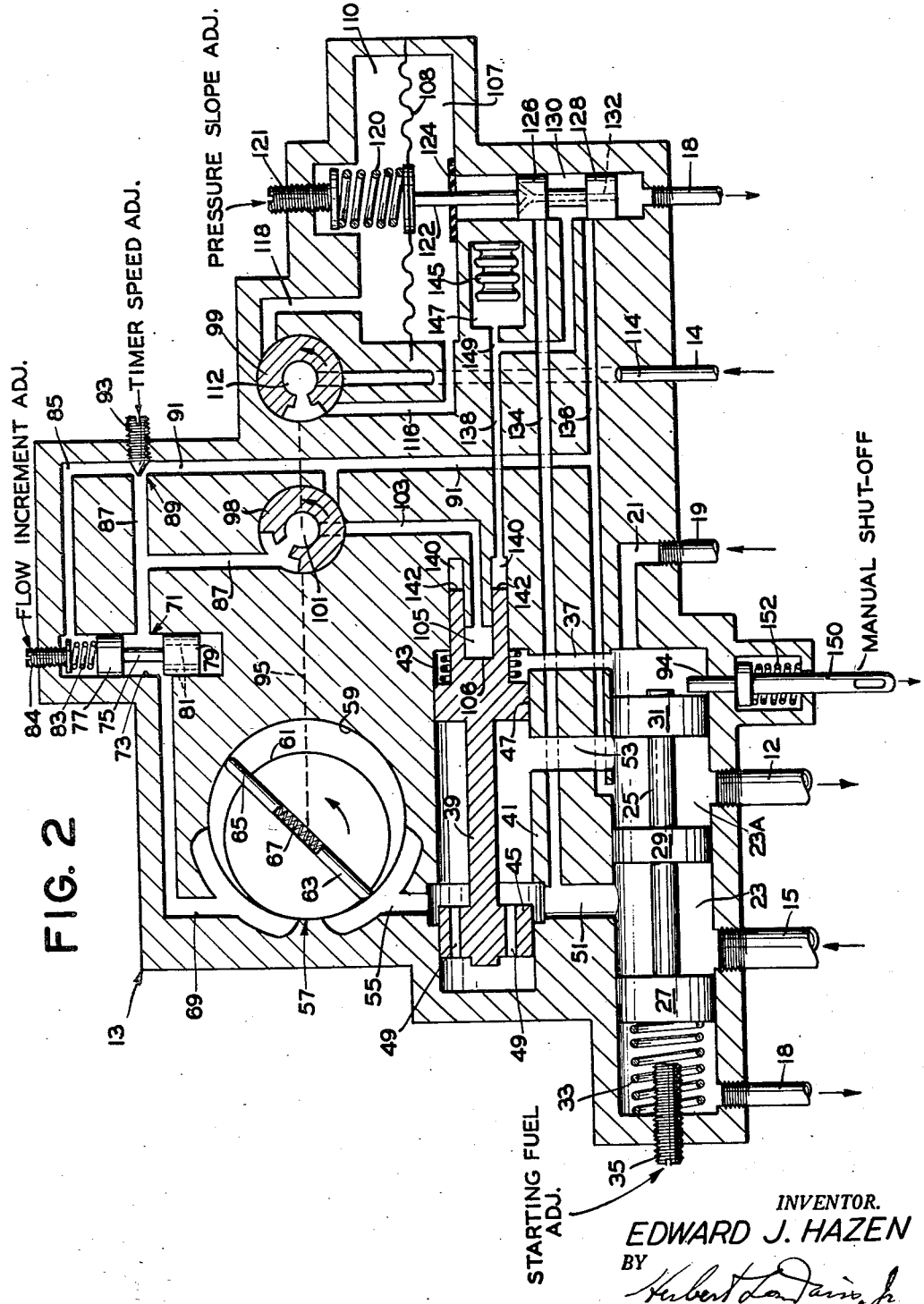
Figure 2 is a diagrammatic view illustrating the operative components of one form of the invention.

Referring to the form of the control shown in Figure 2 in order to start the jet engine in operation, it is necessary to apply, as is usual practice, compressed air to the combustion chamber 8. The compressed air may be applied through a conduit 19 opening into the combustion chamber 8 near the upstream end and close to the fuel nozzles 12A. A passage 21 in the regulator 13 opens from the conduit 19 into one end of a valve chamber 23 in which is slidably mounted a shut-off valve 25 having land portions 27, 29 and 31. The compressed air entering through passage 21 tends to bias the shut-off valve 25 toward the left as viewed in Figure 2 against the biasing force of a spring 33 positioned at the opposite end thereof and into contacting relation with a stop screw 35. In the starting operation, the compressed air applied through passage 21 also acts through a passage 37 on one end of a fuel pressure regulating valve 39 slidably mounted in a valve chamber 41 and biased toward the left as viewed in Figure 2 by a spring 43. The fuel pressure regulating valve 39 has land portions 45 and 47 and passages 49 opening through land portion 47 to the left end of the fuel regulating valve 39.

Conduit 15 from the fuel pump 16 opens into the valve chamber 23 between land portions 27 and 29. There also leads from the chamber 23 between land portions 27 and 29 a passage 51 which opens into valve chamber 41. The conduit 15 is controlled by the land portion 27 of the shut-off valve 25 and passage 51 by the land portion 45 of the fuel pressure regulating valve 39.

An outlet passage 53 leads from the pressure regulating valve chamber 41 into the valve chamber 23A while fuel conduit 12 leads from chamber 23A to nozzles 12A. The outlet passage 53 is controlled by land 31 of the shut-off valve 25.

During the starting cycle, the compressed air biases the shut-off valve 25 and fuel pressure regulating valve 39 to the left so that fuel tank pressure may be supplied unrestricted through the fuel pressure regulating valve 39 to the shut-off valve 25. The shut-off valve positioned to the extreme left acts through land 31 to throttle the fuel tank pressure supplied to the nozzles 12A to the necessary fuel pressure for starting. The fuel pressure for starting can be adjusted by turning stop screw 35 of the shut-off valve 25.

Hydraulic clock

A discharge passage 55 leads from passage 51 to an inlet of a hydraulic clock indicated generally by the number 57.

The hydraulic clock 57 includes a pressure chamber 59 in which is eccentrically mounted a rotor 61 having vanes 63 and 65 biased under tension of a spring 67 into contacting relation with the inner surface of the pressure chamber 59. Fluid pressure entering through conduit 55 then impinges upon the vanes 63 and 65 and tends to drive the rotor 61 in a counter-clockwise direction. A conduit 69 opens from the pressure chamber 59 and serves as an outlet for fluid pressure from the hydraulic clock 57.

Thus simultaneously with the supplying of fuel and compressed air to the jet engine, the hydraulic clock 57 is started in motion and runs at constant speed, due to the regulatory effect of a constant flow regulator 71 into which the passage 69 opens. The regulator 71 includes a valve chamber 73 in which is slidably mounted a valve 75 having land portions 77 and 79. The land portion 79 controls the opening of passage 69 into chamber 73. Passages 81 extend through the land portion 79 so that fluid pressure applied through passage 69 into valve chamber 73 and regulated by valve land 79 so acts upon the lower surface of the land portion 79 as to bias the regulator valve 75 in an upward direction in opposition to the biasing force of a spring 83 and a fluid pressure applied to the upper end of the valve 75 through a passage 85. The spring 83 may be adjusted by a screw 84.

A passage 87 serves as an outlet from chamber 73 and leads from between land portions 77 and 79 of the regulator valve 75. A restricted orifice 89 opens from passage 87 into passages 85 and 91. The latter orifice may be varied by adjustment of a screw 93. Thus the pressure applied to the lower end of the land portion 79 is a measure of the pressure in passage 87 while the pressure applied through passage 85 to the upper end of the land portion 77 is a measure of the pressure applied at the other side of the orifice 89 at passage 91. The constant flow regulator 71 tends to maintain a constant pressure drop across the orifice 89 so as to effect a constant fluid flow through the hydraulic clock 57 and thereby a constant speed of rotation of the hydraulic clock 57. The speed of rotation of the hydraulic clock 57 may be conveniently adjusted by varying the orifice 89 through adjustment of the screw 93, while the flow increment to the nozzles may be adjusted by varying the force applied by spring 83 to the regulator valve 75 through adjustment of the screw 84.

As soon as the starting period has been completed and compressed air is no longer supplied, spring 33 actuates the shut-off valve 25 to the position shown against a stop pin 94 and to the correct wide open position for continuous operation. This permits spring 43 to act on the fuel regulating valve 39 so that there is supplied through the regulating valve 39 a constant minimum fuel pressure to the engine for idling. The effect of spring 43 is intermittently augmented by the addition of fluid pressures acting on the regulating valve 39, as will be explained. The effect of this intermittent augmentation is to give the engine an alternate supply of more, then less, fuel.

Rotary valves

The hydraulic clock 57 is drivingly connected through a shaft 95, indicated diagrammatically in Figure 2 by a dotted line, to a pair of rotary valves 98 and 99. The valve 98 has a valve chamber 101 alternately opening into the high pressure passage 87 at one side of the orifice 89 and into the lower pressure passage 91 at the opposite side of the orifice 89. A passage 103 leads from the valve chamber 101 and opens into a chamber 105 so as to apply a pulsating fluid pressure which is alternately more, then less, to a surface 106 of the fuel regulating valve 39 tending thereby to alternately increase and then decrease the fuel supplied through conduit 12 to the nozzles 12A.

Synchronized with the latter fuel pulses, the pressure of combustion chamber 8 is first distributed to a chamber 107 at the underside of a diaphragm 108 and then to a chamber 110 at the upper side of the diaphragm 108 by the valve 99 coupled to the clock 57. The pressure of combustion chamber 8 is distributed to chamber 107 through conduit 14, passage 114, valve chamber 112 and passage 116 and then alternately to chamber 110 through conduit 14, passage 114, valve chamber 112 and passage 118.

Differential pressure control

The valve 99 has a valve chamber 112 connected by a passage 114 through conduit 14 to the combustion chamber 8. The valve chamber 112 alternately opens into a passage 116 leading to the chamber 107 at the lower side of diaphragm 108, and then into a passage 118 opening into the chamber 110 at the upper side of diaphragm 108.

A spring 120 biases the diaphragm 108 downwardly so as to augment the pressure of the combustion gases applied to chamber 110 and acting in opposition to the pressure of combustion gases applied to chamber 107. The tension of spring 120 may be readily adjusted through a screw 121. The diaphragm 108 controls a pilot valve 122 projecting through a seal 124 and having land portions 126 and 128 slidably mounted in a valve chamber 130. A drain passage 132 extends through the valve stem and opens to the lower end of the valve chamber 130 from which there in turn opens a drain passage leading to drain conduit 18.

The valve lands 126 and 128 control the opening of passages 134 and 136 to a passage 138. The passages 134 and 136 lead respectively from the high pressure fuel inlet passage 51 and the lower regulated nozzle fuel pressure outlet passage 23A. The low pressure passage 91 previously described also opens into the passage 136 and is subject to nozzle fuel pressure.

The passage 138 leads to a main pressure chamber 140 so as to apply a regulated pressure to a surface 142 of the fuel regulating valve 39 and augmenting the force of spring 43 in opposition to the regulated fuel pressure applied at the opposite end of the valve 39.

The diaphragm 108 tends to regulate the valve lands 126 and 128 and thereby the fuel regulating valve 39 so as to maintain a predetermined difference between the combustion chamber pressures applied at the opposite sides of the diaphragm 108. If the latter difference in pressure does not exist, the diaphragm 108 acts under force of the spring 120 and combustion chamber pressures at opposite sides thereof to move the valve lands 126 and 128 to modify the fuel pressure by changing the pressure applied to surface 142 of the fuel regulating valve to effect the predetermined differential between the combustion chamber pressures.

The valves 98 and 99 are so synchronized that fuel flow is modified first by the positioning of valve 98 to increase the fuel, and then the valve 99 is positioned so as to cause diaphragm 108 to sample the resulting combustion pressure in chamber 107; the valves 98 and 99 are then closed and valve 98 positioned to decrease the fuel and valve 99 thereafter positioned so as to cause diaphragm 108 to sample the resulting combustion pressure in chamber 110.

The diaphragm 108 measures the difference between the two sampled pressures resulting under the relatively high and low fuel conditions and causes the adjustment of the fuel regulator valve 39 so as to tend to maintain the predetermined differential, or as indicated in Figure 4, a constant slope to the operating curve.

The slope of the operating curve or differential to be maintained may be readily adjusted by varying the tension of the spring 120 which in its adjusted position maintains a constant differential pressure on the diaphragm 108. The slope of the operating curve may also be adjusted by screw 84 so as to alter the increment of increased fuel supplied to the engine.

A resilient bellows 145 is fixedly mounted at one end to the inner surface of a chamber 147. The chamber is connected through a passage 149 to the passage 138. The bellows 145 is so arranged that expansion and change in the regulated pressure in passage 138 may serve to dampen rapid changes in such pressure supplied the pressure chamber 140 so as to effect more stability of control.

*Shut-off*

In order to shut the entire system off, it is necessary merely to pull pin 94 through the actuating rod 150 so as to release shut-off valve 25 which under the biasing force of spring 33 is then biased to the extreme right position at which land 27 closes the fuel supply conduit 15 to the control.

Upon starting, air pressure acting through conduit 19, as previously explained, will bias the shut-off valve 25 to the extreme left position and pin 94 under force of a spring 152 will be once again biased to the latch position shown in Figure 2. The actuating rod 150 may be connected to a suitable manually operable lever readily accessible for control by the operator of the engine.

*Second form of the invention*

Figure 3:
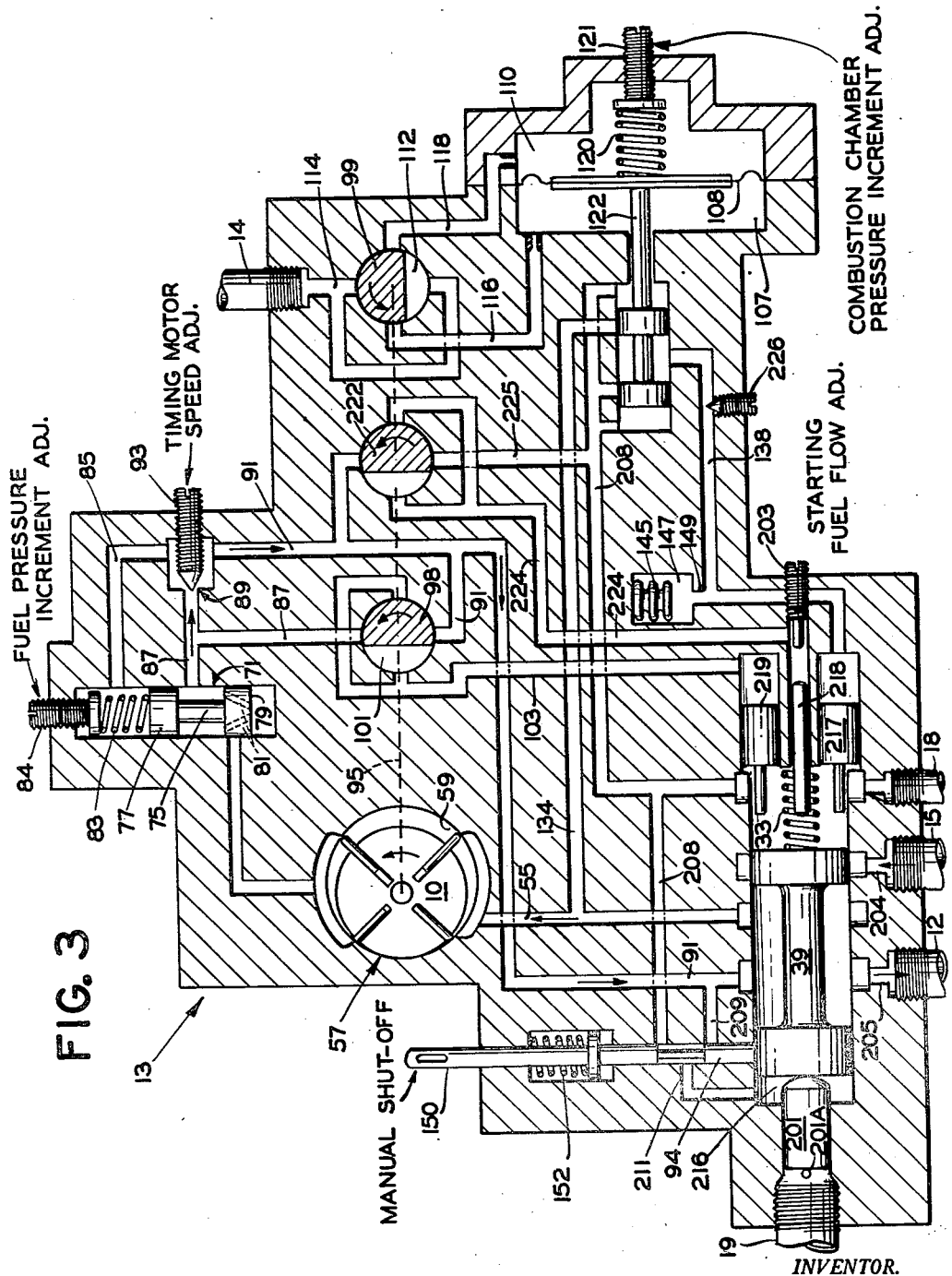
Figure 3 is a diagrammatic view illustrating the operative components of a second form of the invention.

In the second form of the invention illustrated in Figure 3, like numerals indicate corresponding parts to those previously described with reference to Figure 2. Starting air pressure is applied through conduit 19 to a piston 201 which moves to the right and pushes the fuel regulating valve 39 against a stop screw 203. In this starting position the fuel inlet port 204 leading from conduit 15 is uncovered and the fuel is throttled at port 205 opening into nozzle conduit 12 so as to supply the proper engine starting fuel flow which may be adjusted by the screw 203. The positioning of the fuel regulating valve 39 to the right permits a latch pin 94 biased under tension of a spring 152 to move downwardly so as to close passage 208 leading to drain and connect the fuel nozzle pressure through passages 91, 209 and 211 to a chamber 216 at the left of the fuel regulating valve 39.

When the starting fuel pressure is shut off, fuel nozzle pressure in chamber 216 pushes the air piston 201 back against a stop pin 201A and permitting the regulating valve 39 to control the nozzle pressure through the throttling action at port 205 and the pressure balance of the nozzle pressure in chamber 216 acting at one end of regulator valve 39 against the control pistons 217, 218 and 219 which are brought into operative relation with the opposite end of valve 39 upon movement of valve 39 to right.

At the time the port 204 is opened, fuel inlet pressure is supplied through passage 55 to a constant speed hydraulic clock motor 57 of a type heretofore explained with reference to Figure 2.

The clock motor 57 is mechanically connected so as to drive valves 98, 99 and 222. The fluid flow through the motor 57 also passes through pressure regulator 71 and orifice 89. The regulator 71 maintains a constant pressure drop across the orifice 89 thus controlling the fluid flow which determines the speed of the hydraulic clock motor 57. Changing the orifice size by means of the screw 93, as previously described, will change the speed of motor 57, but variations in normal operation of mechanical load on the motor 57 will not change its speed.

The rotary valve 98 alternately connects piston 219 through passage 103 to the relatively high fuel pressure in passage 87 and then to the relatively low fuel pressure in passage 91, while rotary valve 222 likewise alternately connects piston 218 through a passage 224 to nozzle fuel pressure applied through passage 91 and then through a passage 225 to the relatively low fuel drain pressure. The valve 98 serves to alternately apply a uniform pressure increment to piston 219 and thereby to the regulating valve 39 over the entire operating range, while the valve 222 alternately applies a variable pressure increment which increases with increase in nozzle pressure to in turn cause a greater increase in the nozzle pressure at high fuel pressures than at low fuel pressures to effect alternate uniform fuel flow increments over the entire operating range. Assuming fixed engine fuel nozzle orifices, as generally used, a unit increase in fuel pressure effects a decreasing increment of fuel flow as the fuel pressure rises. The effect of valve 222 in alternately supplying a variable pressure increment which increases with increase in nozzle pressure is to compensate under high fuel nozzle pressure conditions for the decrease in flow increment for unit of increase in nozzle pressure.

The sizes of the pistons 218 and 219 are so selected as to effect esesentially constant fuel flow increments for change in fuel pressure over the normal operating range of the fuel pressures. The effect of these fuel increments is to give the engine an alternate supply of more, then less, fuel.

Synchronized with the fuel pulses, combustion chamber pressure is first directed to one side of diaphragm 108 and then to the other side by valve 99 which is coupled to the hydraulic clock motor 57. The valve 99 may be timed in relation to fuel valves 98 and 222 and the time lags in the piping system so that the combustion pressure resulting from the increased fuel flow is directed to the chamber 107 and opposes the spring 120, while the combustion pressure resulting from the decrease in fuel flow is directed to chamber 110 to augment the biasing force of the spring 120 on the diaphgram 108. If the correct difference does not exist between the two thus sampled combustion chamber pressures, spring 120 acts to move the diaphragm 108 and valve 122 to modify the fuel pressure by changing the pressure on piston 217 which in turn controls the nozzle pressure through regulating valve 39. An adjustable valve screw 226 projects into the passage 138 so as to provide a variable restriction to limit the rate of change in the pressure applied to piston 217 and cooperating with damping bellows 145 to effectuate greater stability of control.

The system will continue to function under all conditions, and will regulate average fuel flow to maintain engine operation at the point corresponding to the selected slope on the performance curve, indicated for example in Figure 4 by a line drawn between the points X and Y, indicating the sampled combustion pressures under high and low fuel flow conditions.

The slope at which the control regulates is adjustable by means of a screw 121 which, through spring 120 changes the differential pressure required across diaphragm 108 for the null position of the pilot valve 122.

When manual shut-off rod 150 is pulled outward, pressure in chamber 216 is drained through passages 211, 208 and 18 and stop pin 94 is retracted allowing spring 33 to push regulating valve 39 into the shut-off position, as shown. Valve 39 then closes port 204 stopping all fuel flow to the system from the tank connection. The unit will remain shut down until starting air pressure is again applied to the starting air piston 201.

Although only two embodiments of the invention have been illustrated and described, various changes in the form and relative arrangements of the parts may be made to suit requirements.

What is claimed is:

1. For use with a jet engine having a combustion chamber, a fuel nozzle for said chamber, and means for supplying fuel under pressure to said nozzle; means for regulating the supply of fuel to said nozzle, comprising in combination, a fuel flow regulating valve, combustion chamber differential fluid pressure responsive means, and power means controlled by said last mentioned means for operating said regulating valve so as to maintain a predetermined differential between pressures resulting in said combustion chamber under predetermined alternately high and low fuel flow conditions.

2. The combination defined by claim 1 including regulator control means to alternately increase and decrease said fuel flow, and timing means to actuate said last mentioned means so as to provide predetermined periods of fuel flow increase and fuel flow decrease.

3. The combination defined by claim 2 including means to operably connect the combustion chamber to said differential pressure responsive means so that combustion pressures resulting under the alternate high and low fuel flow conditions are applied to said differential pressure responsive means in opposite senses.

4. The combination defined by claim 2 including valve means driven by said timing means in synchronism with said regulator control means to alternately connect the differential pressure responsive means to said combustion chamber in one sense as the fuel flow is increased and in an opposite sense as the fuel flow is decreased so that the difference between the resulting combustion chamber pressures serves as the basis for controlling the regulating valve through the power means.

5. The combination defined by claim 4 in which said timing means includes a hydraulic clock under pressure of the fuel supply, and a constant flow regulator for said hydraulic clock to maintain the clock at a constant speed.

6. The combination defined by claim 5 including a pair of distributor valves driven by said clock, one of the valves being arranged to affect said regulating valve so as to provide an alternate pulsating supply of more than less fuel to the fuel nozzle, and the other distributor valve being arranged to direct in synchronism with the fuel pulses combustion chamber pressures to said differential fluid pressure responsive means first in one sense and then in another sense so that fuel flow is modified first, then the combustion chamber pressure is sampled, the regulator valve being controlled by said pressure responsive means through said power means so that the regulator valve tends to maintain a constant differential between the sampled pressures.

7. For use with a jet engine having a combustion chamber, a fuel nozzle for said chamber, and means for supplying fuel under pressure to said nozzle; means for regulating the supply of fuel to said nozzle, comprising in combination, a valve slidably mounted for regulating the flow of fuel, differential fluid pressure responsive means including a diaphragm, a pilot valve operated by said diaphragm for controlling the application of fluid pressure to one end of said fuel regulating valve to control the position of the fuel regulating valve, a distributor valve for alternately connecting opposite sides of said diaphragm to the combustion chamber, and timing means for operating said distributor valve.

8. For use with a jet engine having a combustion chamber, a fuel nozzle for said chamber, and means for supplying fuel under pressure to said nozzle; means for regulating the supply of fuel to said nozzle, comprising in combination, a valve slidably mounted for regulating the flow of fuel, differential fluid pressure responsive means including a diaphragm, a pilot valve operated by said diaphragm for controlling the application of fluid pressure to one end of said fuel regulating valve to control the position of the fuel regulating valve, a distributor valve for alternately connecting opposite sides of said diaphragm to the combustion chamber, a second distributor valve to alternately increase and then decrease the fluid pressure applied to the one end of said fuel regulating valve to increase and then decrease the fuel flow to said fuel nozzle, and timing means to position said distributor valves in synchronism so as to maintain a predetermined differential between the pressures resulting in said combustion chamber under the high and then low fuel flow conditions.

9. For use with a jet engine having a combustion chamber, a fuel nozzle for said chamber, and means for supplying fuel under pressure to said nozzle; means for regulating the supply of fuel to said nozzle, comprising in combination, a valve slidably mounted for regulating the flow of fuel, differential fluid pressure responsive means including a diaphragm, a pilot valve operated by said diaphragm for controlling the application of fluid pressure to one end of said fuel regulating valve to control the position of the fuel regulating valve, a distributor valve for alternately connecting opposite sides of said diaphragm to the combustion chamber, a second distributor valve to alternately increase and then decrease the fluid pressure applied to the one end of said fuel regulating valve to increase and then decrease the fuel flow to said fuel nozzle, a third distributor valve to alternately apply a variable pressure increment to the one end of said fuel regulating valve which increment increases with increase in fuel nozzle pressure so as to cause a greater increase in the fuel nozzle pressure at high fuel pressures than at low fuel pressures so as to effect alternate uniform fuel flow increments over the operating range, and timing means to position said distributor valves in synchronism so as to maintain a predetermined differential between the pressures resulting in said combustion chamber under the alternate high and then low fuel flow conditions.

10. For use with an engine having a combustion chamber; a mechanism comprising means for regulating a supply of fuel to the combustion chamber, means acting upon the regulating means to effect relatively small and uniform increments of additional excess fuel flow to the combustion chamber at predetermined intervals, differential pressure sensing means to sample the resulting combustion chamber pressures with and without the additional excess fuel flow increments, and means controlled by said pressure sensing means for operating said regulating means so as to tend to maintain a predetermined differential between the combustion chamber pressure resulting with the additional excess fuel flow increment and the combustion chamber pressure resulting without the additional excess fuel flow increment.

11. For use with an engine having a combustion chamber; a mechanism comprising a fuel regulating valve for said combustion chamber, means to hydraulically position said fuel regulating valve, said last mentioned means including a first valve to control application of hydraulic pressure to said fuel regulating valve, clock means to position said first valve to cause the application of hydraulic pressure to said fuel regulating valve for predetermined intervals to effect relatively small and uniform increments of excess fuel flow to the combustion chamber, a pressure sensing membrane, a second valve to alternately apply the combustion chamber pressure to one side of said membrane and then to the other side of said membrane, said second valve driven by said clock means in synchronism with said first valve so that said membrane is affected by the difference between the combustion chamber pressure resulting from the excess fuel increment and the combustion chamber pressure resulting without the excess fuel increment, a third valve operated by said membrane to control application of hydraulic pressure to said regulating valve so as to tend to maintain a predetermined differential between the thus resulting combustion chamber pressures.

12. The combination comprising a differential pressure sensing membrane, a valve to direct a fluid pressure alternately to one side and then the other side of said membrane, a second valve to effect an alternate increase and then a decrease in said fluid pressure, and means to drive said first and second valves in synchronism so that said membrane may be affected by the difference between the increase and decrease in said fluid pressure.

13. The combination defined by claim 12 including means operated by said membrane to tend to maintain a predetermined differential between the increase and decrease in said fluid pressure.

14. For use with an engine having a combustion chamber; a mechanism comprising a valve for regulating the supply of fuel to said combination chamber, means to position said regulating valve including a plurality of hydraulically actuated piston elements, a first valve member to control the application of hydraulic pressure to one of said elements, a second valve member to control the application of hydraulic pressure to another of said elements, a timer to operate said first valve member to cause said one piston element to position said regulating valve so as to effect a small and uniform periodic increase and decrease in the fuel flow to the combustion chamber, and differential pressure diaphragm to position said second valve member, a third valve member positioned by said timer in synchronism with said first valve member, said third valve member to alternately apply the combustion chamber pressure to one side of said diaphragm and then to the other side of said diaphragm so that said diaphragm acts through said second valve member and other piston elements in such a manner as to cause said regulating valve to tend to maintain a predetermined differential between the combustion chamber pressures resulting upon the periodic increase and decrease in the fuel flow effected through the operation of said first valve member.

15. The combination defined by claim 14 including combustion chamber pressure responsive means for placing the fuel regulating valve into operative relation upon starting the engine.

16. The combination defined by claim 14 including manually operable means for placing the fuel regulating valve in an inoperative relation.

17. The combination defined by claim 14 including a third piston acting upon said fuel regulating valve to place the same in operative relation in response to the application of a fluid pressure medium to the combustion chamber of the engine in starting, latch means for locking the fuel regulating valve in the latter operative relation, and manually operable means to release said latch means to permit the return of said regulating valve to an inoperative relation upon discontinuance of operation of the engine.

18. For use with an engine having a combustion chamber and a fuel nozzle in said chamber; a mechanism comprising a valve for regulating the supply of fuel to said fuel nozzle, means to position said regulating valve including first, second and third hydraulically actuated piston elements, a first valve member to control hydraulic pressure to said first piston element, a second valve member to control hydraulic pressure to said second piston element, a third valve member to control hydraulic pressure to said third piston element, said second and third valve members to alternately increase and then decrease the hydraulic pressures applied to said second and third piston elements, said third valve member applying an increase and decrease in the hydraulic pressure applied to said third piston element which varies with increase in fuel nozzle pressure so as to position said fuel regulating valve in such a manner as to effect a greater increase in the fuel nozzle pressure at high fuel pressures than at low fuel pressures so as to effect alternate uniform fuel flow increments, and differential pressure responsive means sensitive to the difference in the combustion chamber pressures effected by the alternate uniform increase and decrease in the fuel flow, said differential pressure responsive means operatively connected to said first valve member so as to regulate the hydraulic pressure applied to said first piston element so as to tend to maintain a predetermined differential between the combustion chamber pressures resulting from such uniform increase and decrease in the fuel flow.

19. The combination defined by claim 18 including a hydraulic clock driven by fuel supply pressure, a constant flow regulating valve for maintaining the fuel flow through said clock substantially constant, the differential pressure responsive means including a diaphragm and a fourth valve member to alternately connect the combustion chamber pressure to one side and then the other side of said diaphragm, said second, third and fourth valve members being driven in synchronism by said hydraulic clock, and said diaphragm being operably connected to said first valve member.

20. The combination defined by claim 19 including a spring acting upon said diaphragm and adjustably mounted to vary the differential between the combustion chamber pressures.

21. The combination defined by claim 19 in which there is applied through said constant flow regulating valve a hydraulic pressure medium for actuating said second and third piston elements, and in which the constant flow regulating valve includes a spring acting upon said last mentioned valve and adjustably mounted to vary the hydraulic pressure actuating said second and third piston elements so as to thereby adjust the fuel flow increments.

22. The combination defined by claim 19 in which there is provided a restricted opening at the outlet of the constant flow regulator, said constant flow regulator tending to maintain a constant pressure across the restricted opening, and a member adjustably mounted to vary the restricted opening and thereby vary the speed of the hydraulic clock.

23. For use with a jet engine having a combustion chamber; a mechanism comprising a fuel regulating valve, a first combustion chamber fluid pressure responsive means for operating said valve, and second means responsive to fluid pressure applied to said combustion chamber to place said regulating valve into an operative relation upon starting the engine.

24. For use with a jet engine having a combustion chamber; a mechanism comprising a fuel regulating valve, a first combustion chamber fluid pressure responsive means for operating said valve, and manually operable latch means for locking said regulating valve in an operative relation and for selectively releasing said regulating valve to an inoperative relation.

25. For use with a jet engine having a combustion chamber, a mechanism comprising a fuel regulating valve, first means responsive to the combustion chamber pressure for operating said valve, second means responsive to fluid pressure applied to said combustion chamber to place the regulating valve into an operative relation, latch means for locking said regulating valve in said operative relation, and manually operable means for releasing said regulating valve to an inoperative relation.

26. For use with a jet engine having a combustion chamber; a mechanism comprising a fuel regulating valve, a fluid pressure responsive means for operating said valve, a control valve to place said regulating valve in and out of operative relation, and said control valve responsive to fluid pressure applied to said combustion chamber to place said regulating valve in an operative fuel regulating relation upon the application of said fluid pressure for starting the engine.

No references cited.